(12) United States Patent
MacBain et al.

(10) Patent No.: US 7,390,176 B2
(45) Date of Patent: Jun. 24, 2008

(54) MULTI-PORT SUCTION REED VALVE WITH OPTIMIZED TIPS

(75) Inventors: Scott M. MacBain, Syracuse, NY (US); Ronald J. Duppert, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 1511 days.

(21) Appl. No.: 09/971,301

(22) Filed: Oct. 5, 2001

(65) Prior Publication Data

US 2003/0068245 A1 Apr. 10, 2003

(51) Int. Cl.
*F04B 39/10* (2006.01)
*F04B 53/10* (2006.01)
*F16K 15/00* (2006.01)

(52) U.S. Cl. .................. 417/571; 417/569; 417/560; 137/512.15

(58) Field of Classification Search ................ 417/560, 417/569, 571; 137/512.15, 856, 855
See application file for complete search history.

(56) References Cited

U.S. PATENT DOCUMENTS

| | | | | | |
|---|---|---|---|---|---|
| 947,536 | A | * | 1/1910 | Wenkel | 417/558 |
| 2,109,541 | A | * | 3/1938 | Valley | 417/571 |
| 2,725,183 | A | * | 11/1955 | Hanson | 137/512.15 |
| 2,908,287 | A | * | 10/1959 | Augustin | 137/856 |
| 3,241,748 | A | * | 3/1966 | Cramer et al. | 137/512.15 |
| 5,562,431 | A | * | 10/1996 | Plummer | 417/569 |
| 6,102,680 | A | * | 8/2000 | Fraser et al. | 417/569 |

* cited by examiner

*Primary Examiner*—Charles G. Freay
*Assistant Examiner*—Timothy P. Solak

(57) ABSTRACT

A reed valve having a plurality of tips and associated recesses is provided as a compressor suction valve with each valve tip coacting with a suction port. The recesses are located in the housing structure defining the cylinder of the compressor and are spaced a distance on the order of 0.1 inches from the tips when the suction valve is closed. The valve is secured on one side of the cylinder and each tip is located along a line from the center of the cylinder through the center, or axis, of a suction port.

4 Claims, 3 Drawing Sheets

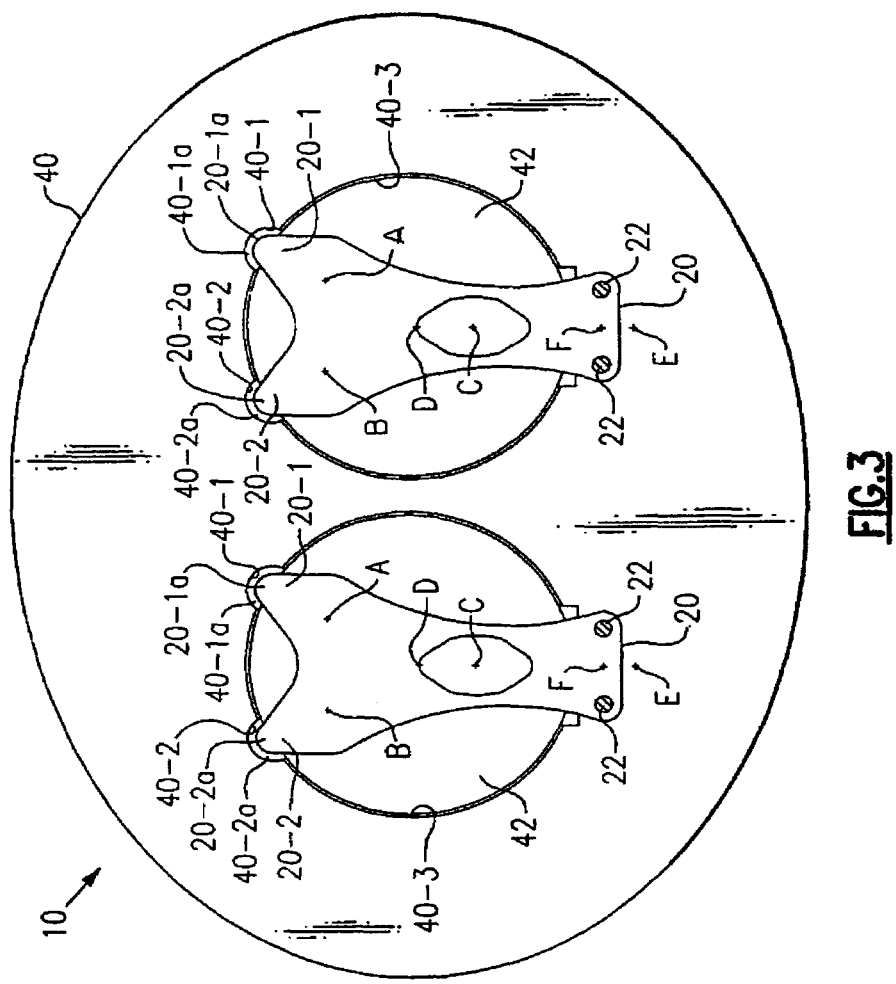

MULTI-PORT SUCTION REED VALVE WITH OPTIMIZED TIPS

BACKGROUND OF THE INVENTION

A typical reciprocating compressor will have a valve plate with one, or more, suction ports and discharge ports formed therein. Normally the Suction and discharge valves will be of the same general type. Each valve would be normally closed and would open due to a pressure differential across the valve in the direction of opening. Since suction valves open into the compression chamber/cylinder they generally do not have valve backers in order to minimize the clearance volume and thus deflection of the valve is not physically limited. When a suction valve opens, the valve lip(s) engage recess(es) in the housing structure defining the piston cylinder after a small amount of opening movement with further opening being due to flexure of the valve away from the valve seat and into the cylinder.

The resilience of the suction valves and adherence of the valve to the valve seat due to an oil film ("stiction") resists the opening of the suction valve. The opening movement of the suction valve before the tip(s) engage the recess(es) would only permit a restricted flow into the cylinder. So, the valve tip slams into the recess and flexes into the cylinder for every cycle. The greatest degree of flexure occurs, nominally, at the mid-point of the valve between the tip support and the pin support. Because the valve tips are located near the suction ports and because the valve tips are in a nominal line contact with the housing structure, the valve tips tend to be stressed which can result in valve failure by permitting the valve to be drawn into the cylinder.

SUMMARY OF THE INVENTION

For multi-port suction valves, each valve tip and the associated tip recess are located along lines extending from the axis of the cylinder through the axis of the associated suction port. This arrangement minimizes the distance between the axis of each suction port and the tip recess and places the load due to flow through the suction ports as close as possible to the cylinder wall tip support thereby minimizing the effects of transverse bending while shortening the span from the pins to the tips. This combination yields the valve with the lowest maximum stress.

It is an object of this invention to reduce maximum operating stress on suction valves.

It is another object of this invention to optimize valve tip and valve tip recess locations. These objects, and others as will become apparent hereinafter, are accomplished by the present invention.

Basically, a valve tip and its associated recess are provided along each line from the center of the cylinder through the center, or axis, of a suction port.

BRIEF DESCRIPTION OF THE DRAWINGS

For a fuller understanding of the present invention, reference should now be made to the following detailed description thereof taken in conjunction with the accompanying drawings wherein:

FIG. 3 is a view taken along line 3-3 of FIG. 2 and with the second suction valve in place.

DESCRIPTION OF THE PREFERRED EMBODIMENT

Figure 1:
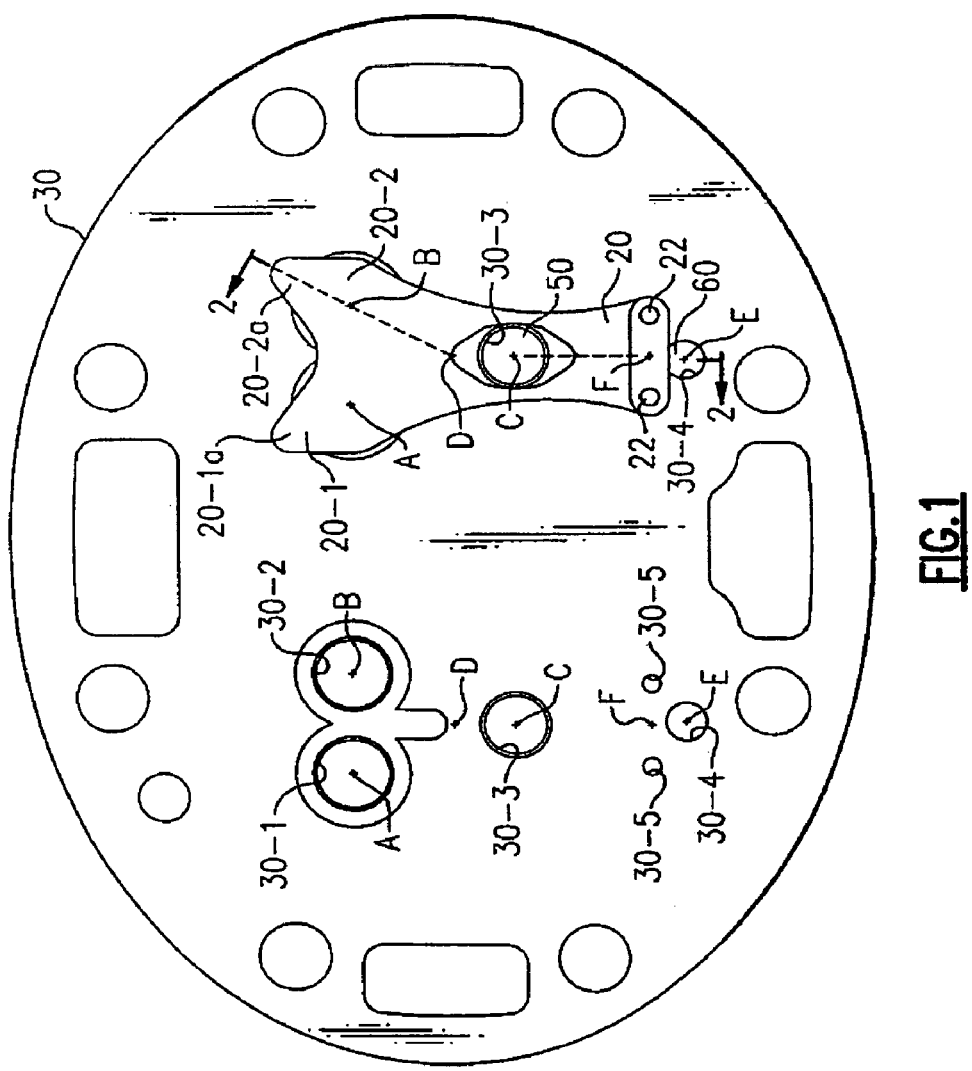
FIG. 1 is a cylinder side view of a valve plate showing one of two suction valves in place.
Figure 2:
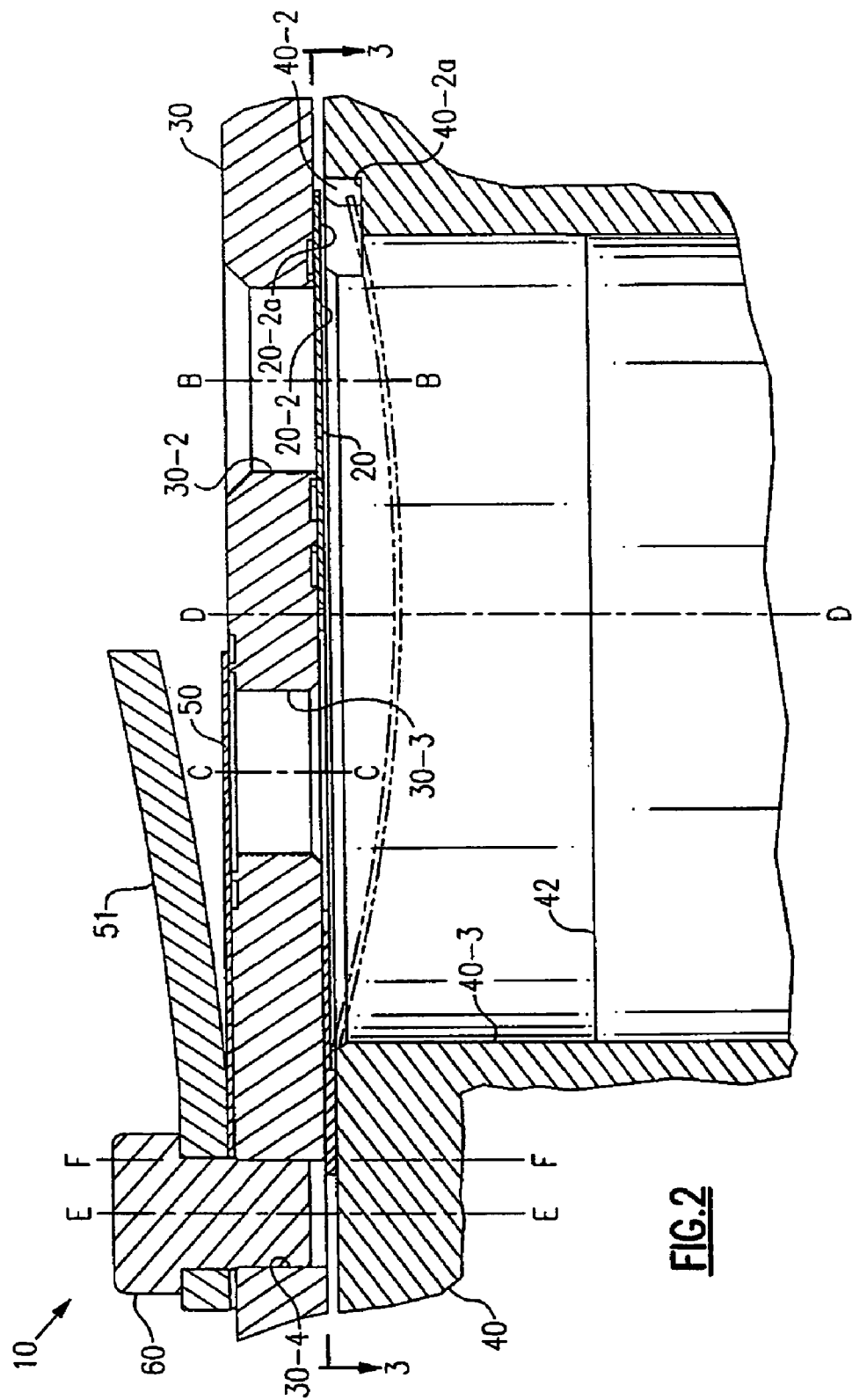
FIG. 2 is a sectional view taken along line 2-2 of FIG. 1.

In FIGS. 1 and 2, the numeral 30 generally designates a valve plate associated with two cylinders of a reciprocating compressor. Two, or more, suction passages 30-1 and 30-2 having axes A and B, respectively, and at least one discharge passage 30-3 having an axis C are associated with each cylinder. The point D corresponds to the axis of a cylinder. The point E corresponds to the axis of the bore 30-4 and pin/bolt 60 holding valve plate 30, and discharge valve 50 in place when a single bolt 60 is used. If more than one bolt 60 is used, axis E would be at a mid-point of a line going through their centers. Pins 22 are received in bores 30-5 and secure suction valve 20 in place. Axis F is the mid-point between the axes of pins 22 and their bores 30-5 for each suction valve 20. The axes A, B, C, D, E and F are illustrated as points or lines, even in the absence of the related structure, because of their relationships relative to the present invention. Referring specifically to FIG. 1, suction passages 30-1 and 30-2 are symmetrically located relative to a plane defined by axes C, D, E and F. It will be noted that the plane defined by axes C, D, E and F divides suction valve 20 into two symmetrical portions but that only two of the axes are necessary to define the plane. If there were two discharge passages associated with a cylinder, the plane of symmetry would be defined by axis D and E together with a mid-point of the axes of the two discharge passages. It will be noted that suction passages 30-1 and 30-2 are also symmetrically located as to suction valve 20 when it is in place. Discharge valve 50 is only visible through discharge passage 30-3. Suction valve 20 has two arms or projections, 20-1 and 20-2, respectively, which, as noted, are symmetrical with respect to suction valve 20. The first arm 20-1 extends in the direction of a plane defined by axes A and D and terminates in a tip 20-1a which is symmetrical relative to the plane defined by axes A and D. The second arm 20-2 extends in the direction of a plane defined by axes B and D and terminates in a tip 20-2a which is symmetrical relative to the plane defined by axes B and D.

In FIGS. 2 and 3, the numeral 10 generally designates a reciprocating compressor with two cylinders being illustrated. As is conventional, each cylinder of compressor 10 has a suction valve 20 and a discharge valve 50, which are illustrated as reed valves, as well as a piston 42 which is located in bore 40-3 in housing structure 40. Valves 20 and 50 coact with valve plate 30 in their valving action. Discharge valve 50 has a backer 51 which limits the movement of valve 50 and is normally configured to dissipate the opening force applied to valve 50 via discharge passage 30-3 over its entire opening movement. When the valve 20 is in the open position which is shown in phantom in FIG. 2, tips 20-1a and 20-2a engage ledges 40-1a and 40-2a in recesses 40-1 and 40-2, respectively, in housing structure 40 which act as valve stops. Ledges 40-1a and 40-2a are engaged after an opening movement of suction valve 20 on the order of 0.1 inches, in order to minimize the clearance volume, with Further opening movement occurring by flexure of valve 20 as shown in phantom Specifically, movement of valve 20 is as a cantilevered beam until tips 20-1a and 20-2a engage ledges 40-1a and 40-2a, respectively. At this point there are three locations of support. The first is at the secured end of valve 20 and is in the nature of a line or thin band contact with housing structure 40 symmetrically located with respect to a plane defined by axes C, D, E and F and tending to produce the flexure shown in phantom in FIG. 2. This flexure is essentially about an axis perpendicular to the plane defined by axes C, D, E and F. At one level tips 20-1a and 20-2a effectively support the free end of the valve 20 to produce the flexure illustrated in phantom. This, however, is the result of the individual coaction of tips 20-1a and 20-2a with ledges 40-1a and 40-2a, respectively. As best shown in FIG. 3, the portions of tips 20-1a and 20-2a overlying ledges 40-1a and 40-2a, respectively, are the narrowest portions of valve 20 and are symmetrical about the planes defined by axes A and D and axes B and D, respectively. Being narrow, tips 20-1a and 20-2a are prone to being flexed. Due to the symmetry, tips 20-1a tends to flex about an axis transverse to the plane defined by axes A and D and tips 20-2a tends to flex about an axis transverse to the plane defined by axes B and D.

Because flexure relative to tips 20-1a and 20-2a is about axes transverse to planes defined by axis A and D and axes B and D, respectively, the greatest amount of movement of tips 20-1a and 20-2a due to flexure is required to draw valve 20 into bore 40-3. Because of the symmetry of tips 20-1a and 20-2a relative to the planes defined by axis A and D and axes B and D, the forces due to the gas flow through the suction ports 30-1 and 30-2 also act symmetrically. Stress is minimized by minimizing the effects of transverse bending by minimizing the distance between the applied load on the valve due to gas flow and the valve tip support by ledges 40-1a and 40-2a.

In operation, suction valves 20 are unseated during the suction stroke when the pressure differential across valves 20 is sufficient to overcome the inherent spring force of the valve 20, adhesion forces, etc. Upon the unseating of a valve 20, impingement by the suction flow through suction passages 30-1 and 30-2 flexes valve 20 relative to the fixed end of valve 20 until tips 20-1a and 20-2a engage ledges 40-1a and 40-2a of recesses 40-1 and 40-2, respectively. At this point there is no longer flexure solely relative to a single fixed end. The major flexure is at a, nominal, mid-point between the fixed end and the tips 20-1a and 20-2a which engage ledges 40-1a and 40-2a about an axis transverse to a plane defined by axes C and D. Additionally, there is flexure by each of the tips 20-1a and 20-2a and/or by their respective arms and 20-1 and 20-2. Tip 20-1a flexes about an axis transverse to a plane defined by axes A and D and tip 20-2a flexes about an axis transverse to a plane defined by axes B and D. The flexure of tips 20-1a and 20-2a causes their movement relative to ledges 40-1a and 40-2a, respectively, to be directly towards axes A and B, respectively, which are at a minimum distance such that the maximum stress produced is reduced.

It will be noted that movement of tips 20-1a and 20-2a, to permit flexure, is along planes A-D and B-D, respectively, which is also along a radius of bore 40-3. This results in movement along planes which results in the tips 20-1a and 20-2a being centered relative to recesses 40-1 and 40-2. Accordingly, clearances around the tips 20-1a and 20-2a can be minimized thereby reducing the clearance volume and forces are balanced on the tips 20-1a and 20-2a in their engagement with recesses 40-1a and 40-2a, respectively.

Although a preferred embodiment of the present invention has been described and illustrated, other changes will occur to those skilled in the art. For example, three, or more, suction ports may be used. It is therefore intended that the scope of the present invention is to be limited only by the scope of the appended claims.

What is claimed is:

1. In a reciprocating compressor having a housing structure defining a cylinder with an axis, a piston located in said cylinder, a valve plate having a plurality of suction ports each having an axis, at least one discharge port having an axis, said housing structure defining a plurality of ledges spaced from said valve plate and circumferentially spaced about a portion of said cylinder, a suction valve secured at a location circumferentially spaced from said plurality of ledges located in said portion of said cylinder and adapted to move in and out of seating engagement with said suction ports and contact with said ledges, means for supporting said suction valve, the improvement comprising:

said suction valve having a plurality of arms having free ends terminating in tips with each tip extending in a direction defined by a plane defined by said axis of said cylinder and a corresponding axis of one of said suction ports.

2. The improvement of claim 1 wherein said tips are symmetrical with respect to the corresponding plane defined by said axis of said cylinder and a corresponding axis of said suction ports.

3. The improvement of claim 2 wherein each of said tips coact with a corresponding one of said plurality of ledges and are symmetrical therewith.

4. The improvement of claim 1 wherein said suction valve is symmetrical with respect to a plane defined by said axis of said cylinder and a mid-point of said means for supporting said suction valve.

* * * * *

UNITED STATES PATENT AND TRADEMARK OFFICE
CERTIFICATE OF CORRECTION

PATENT NO. : 7,390,176 B2  Page 1 of 1
APPLICATION NO. : 09/971301
DATED : June 24, 2008
INVENTOR(S) : Scott M. MacBain et al.

It is certified that error appears in the above-identified patent and that said Letters Patent is hereby corrected as shown below:

Column 1, Line 15, delete "lip(s)", insert --tip(s)--

Column 2, Line 56, delete "Further", inset --further--

Column 2, Line 57, delete "phantom", insert --phantom.--

Column 3, Line 14, delete "axis A", insert --axes A--

Column 3, Line 18, delete "axis A", insert --axes A--

Signed and Sealed this

Eleventh Day of May, 2010

David J. Kappos
*Director of the United States Patent and Trademark Office*